United States Patent [19]

Parkinson

[11] Patent Number: 4,739,786

[45] Date of Patent: Apr. 26, 1988

[54] LIQUID LEVEL MONITORING ASSEMBLIES

[76] Inventor: Craig Parkinson, Bourke St., Blacks Beach QLD 4741, Australia

[21] Appl. No.: 887,827

[22] PCT Filed: Oct. 31, 1985

[86] PCT No.: PCT/AU85/00265

§ 371 Date: Jun. 27, 1986

§ 102(e) Date: Jun. 27, 1986

[87] PCT Pub. No.: WO86/02725

PCT Pub. Date: May 9, 1986

[30] Foreign Application Priority Data

Nov. 1, 1984 [AU] Australia ............................ PG7943
Dec. 6, 1984 [AU] Australia ............................ PG8446
Apr. 24, 1985 [AU] Australia ............................ PH00295

[51] Int. Cl.[4] .............................................. F17D 3/00
[52] U.S. Cl. ........................................ 137/2; 73/304 R; 137/392; 307/118; 340/620; 361/178; 417/36
[58] Field of Search ................ 137/1, 2, 386, 392; 73/304 R, 304 C; 340/620; 417/36; 307/118; 361/178

[56] References Cited

U.S. PATENT DOCUMENTS

| 2,410,278 | 10/1946 | Farris et al. | 73/304 R |
| 2,412,363 | 12/1946 | Silverman | 73/304 R |
| 4,287,756 | 9/1981 | Gallagher | 73/304 R |
| 4,551,068 | 11/1985 | Boudreaux | 137/392 |

FOREIGN PATENT DOCUMENTS

| 27973 | 9/1909 | United Kingdom | 137/392 |
| 1497120 | 1/1978 | United Kingdom | 73/304 R |

*Primary Examiner*—George L. Walton
*Attorney, Agent, or Firm*—Murray and Whisenhunt

[57] ABSTRACT

A monitoring assembly (20) which has a plurality of sensors (24) arranged in spaced relationship along a body (23) which may be suspended from a coded multicore cable (25) in a reservoir to monitor liquid levels therein. Each sensor (24) is connected to a respective coded core (43) of the multicore cable (25) such that any sensor (24) may be selectively coupled to remote control apparatus.

17 Claims, 5 Drawing Sheets

LIQUID LEVEL MONITORING ASSEMBLIES

This invention relates to improved liquid level monitoring assemblies and to methods of manufacturing same.

The monitoring assembly of the present invention may be used for monitoring liquid levels in many types of liquid reservoirs such as water or liquid chemical reservoirs, sullage pits, sewage and effluent holding tanks. However, for illustrative purposes only, the invention will be described hereinafter with reference to the monitoring of levels in sewage holding tanks.

In a sewered area, sewage may be fed to a holding tank or pit provided with a submersible pump which is actuated automatically to maintain the sewage level in the pit between set upper and lower levels. These switching levels are at present monitored by separate mercury switches or sensing probes supported with their respective lower ends at the selected switching levels. Normally at least four probes are used. These comprise a common probe or earth probe held at all times in the liquid, a stop probe at the lower liquid level for stopping the pump when the liquid falls beyond that level, a start or duty probe at the upper liquid level for starting the pump when the liquid rises to that level and an alarm probe at a higher level to warn of liquid levels above the duty probe level. These probes may be stainless steel rods suspended from insulated electrical cables and held in spaced apart relationship by suitable spacers or they may be supported on brackets fixed to the pit wall.

There are many problems associated with such arrangements. For example, dissimilar metal joints may be formed at the junction between each probe and its support and this may lead to corrosion and breakage. Such junctions also provide a discontinuity at which foreign matter may accumulate and prevent effective operation of the probe. Foreign matter may also build up on mercury switches and inhibit their efficient operation.

A further major disadvantage associated with such level sensing assemblies is that is necessary to descend into the pit for maintenance purposes, such as cleaning, or for varying their switching level. These operations are frequently required as foreign matter including fat, builds up at the duty level. These maintenance operations may be dangerous and unpleasant.

The invention aims to alleviate the abovementioned disadvantages and to provide a liquid level monitoring assembly which will be reliable and efficient in use. Other objects and advantages of this invention will hereinafter become apparent.

With the foregoing and other objects in view, this invention in one aspect resides broadly in a liquid level monitoring assembly including an elongate body supporting a plurality of exposed sensors arranged at spaced intervals along the body and being insulated from one another and a plurality of leads extending from said body and each being connected to a respective sensor.

Preferably the leads from each sensor exit from the top end of the supporting body as cores of a multi-core cable and each core is colour coded or numbered or otherwise identified to indicate the sensor to which it is connected. Sealing means such as a gland may be provided to form a seal about the cable sheath at its connection to the supporting body. Alternatively the sheath may be glued to the body or sealed by a filler or it may be left unsealed if undesired.

In a preferred form the elongate body has a substantially continuous and preferably a substantially smooth outer surface so as to inhibit build-up of foreign matter thereon. The exposed portion of each sensor may be substantially co-extensive with the outer surface, or the exposed portion could be spaced outwardly or inwardly of the outer surface if desired. For example the exposed portion could be constituted by a screw or rivet head, the rivet passing into a tubular body to connect a suitable connector means associated with a respective lead. Thus in one form the monitoring assembly could be formed by connecting a plurality of metal rings to a suitable wiring harness such that the rings are held in spaced apart relationship so that the harness can be drawn through a tubular body formed of plastics material with the rings supported co-axially in the body and then rivetting the rings to the body so that the rivet heads form the sensors. The body could then be filled with a suitable grout.

The body may be of solid cylindrical form and of circular cross sectional configuration and each sensor may include an exposed metal ring extending about the body and connected to external leads. However in constructions which utilize an exposed annular sensor it is preferred that the metal ring be flush with the surface of the body so that the sensor does not provide a continuous obstruction around the body. Alternatively, each sensor may be in the form of a bar extending at right angles to the body axis and having exposed end portions substantially flush with the outer surface of said elongate body. Of course the latter could be solid or tubular and could have cross-sectional configurations other than circular. The cross-section could be square or hexagonal or of an irregular shape for example. It is preferred that the leads be concealed within the body and encapsulated in a medium such as rubber or plastics grout or the like, but a suitable mastic or liquid like encapsulating material may be used if desired. Encapsulation is utilized to maintain the dissimilar metal point between the leads and the sensors remote from the liquid and thus impervious to corrosion.

In the preferred form the elongate body is tubular and is built up from a plurality of tubular sections including sensor sections which support the sensors and spacer sections which extend between said sensor sections. However the body could be moulded in one piece about the sensors and their leads, which could be supported in a female mould for this purpose.

The liquid level monitoring assembly may be used in a sewage or effluent pit for example and in such installation its outer surface may become coated with material which has a low electrical conductivity. Thus while sensors exposed all around the body may be used they do provide a relatively wide conductive path to this low conductivity coating which may allow significant electrical leakage between adjacent sensors which may lead to false monitoring. Furthermore if the lowest sensor is utilized as a common connection this leakage may prevent an open circuit being monitored when the liquid level drops beyond the monitoring assembly and this in use could result in continued operation of the pump after all the liquid has been pumped out. This would result in damage to the pump.

Accordingly it is preferred that the sensors extend only partway around the body so as to minimise the effective width of the conductive path to this low conductivity coating and thus leakage between the sensors. It is also preferred that a remote earth or common connection be provided to ensure shutdown of the pump when the liquid level falls below the monitoring assembly. Furthermore, as fat may build up at the level at which the liquid cyclically reaches, the fat may blank out the sensor at that level. Thus it is preferred that the sensors be of elongate form extending axially along the body to minimise the possibility of total coverage of the sensor with such build up.

It is also preferred that the monitoring assembly have a plurality of sensors, such as twelve for example, whereby the active sensors may be connected to control apparatus leaving many spare sensors for interchange with the active sensors. Thus a standard monitoring assembly may be formed with regularly spaced sensors which may be utilized in a wide range of applications. Also such a monitoring assembly may be cut to any desired length to provide the required sensors.

In another aspect this invention resides broadly in a reservoir assembly having a liquid level monitoring assembly provided with a plurality of vertically spaced sensors including active sensors and further non-active sensors and each said sensor having an identified connection remote from said monitoring assembly and wherein the identified connections for said active sensors are connected to control means for controlling the liquid level in said reservoir. The active sensors may be for example sensors for pump stop, pump start, standby and alarm and any one of the non-active sensors may be interchanged with an active sensor to vary the selected levels as desired. Preferably the control means is disposed in an above ground control station remote from said reservoir assembly.

In another aspect this invention resides broadly in a method of operating a reservoir assembly wherein said control means is adapted to control a pump assembly which may be activated to pump liquid from said reservoir, the method including: connecting vertically spaced sensors of said liquid level monitoring assembly to said control means to monitor upper and lower liquid levels at which the control means starts and stops said pump assembly and periodically interchanging the connection of said control means to the upper sensor with another sensor on said liquid level monitoring assembly whereby the upper liquid level is varied to reduce build up of fat or other foreign matter at the upper level.

In order that this invention may be more readily understood and put into practical effect, reference will now be made to the accompanying drawings which illustrate a preferred embodiment of the invention and wherein.

Figure 1:
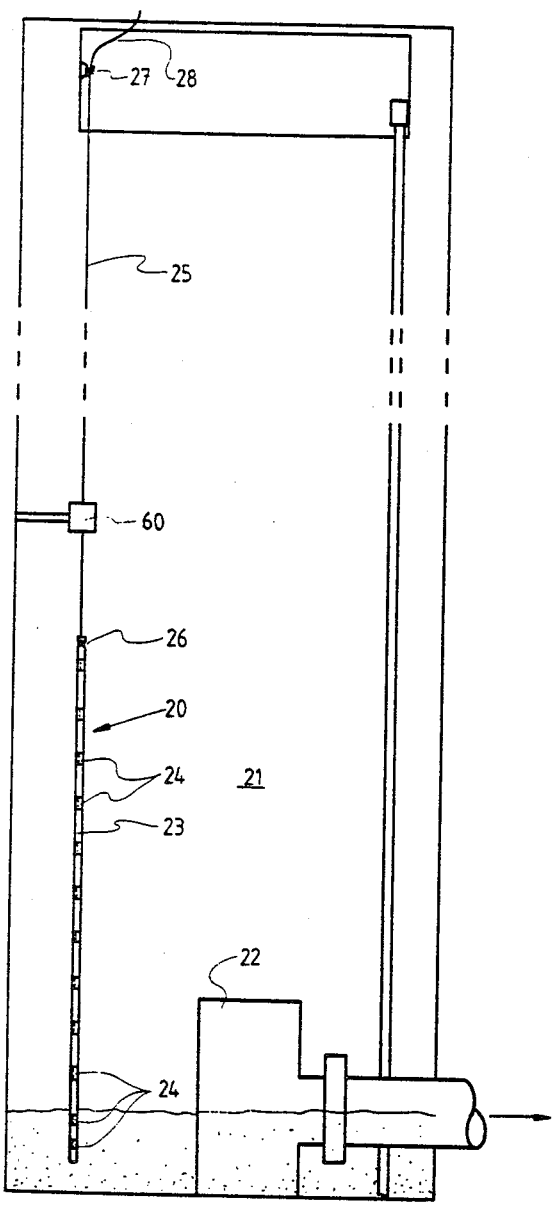
FIG. 1 is a diagrammatic illustration of a typical installation utilizing a liquid level monitoring assembly made in accordance with the present invention.

Referring to FIG. 1 it will be seen that the monitoring assembly 20 may be installed in a sewage pit 21 in which a submersible pump assembly 22 is installed for maintaining the sewage at a desired level. For this purpose the monitoring assembly 20 includes an elongate body 23 formed of plastics material and supporting a plurality of sensors 24 in vertically spaced apart relationship such that the sensors 24 are electrically isolated from one another. In the monitoring assembly 20 in the illustrated embodiments there are provided twelve sensors 24, the lower pair of which are spaced apart about 100 millimetres while the remaining sensor means 24 are equally spaced apart a distance of about 200 millimetres. The body 23 may have a diameter of 30 millimetres but of course these dimensions can be varied as desired. Each sensor means 24 is connected to a respective lead of a multi-core cable 25 which is secured sealably to the top end 26 of the monitoring assembly. The cable 25 is supported by an upper mounting 27 adjacent the entrance to the pit 21 and from which the monitoring assembly 20 is suspended. The tail portion 28 of the cable 25 is directed to suitable above ground control apparatus (not shown) for controlling operation of the pump assembly 22.

Figure 2:
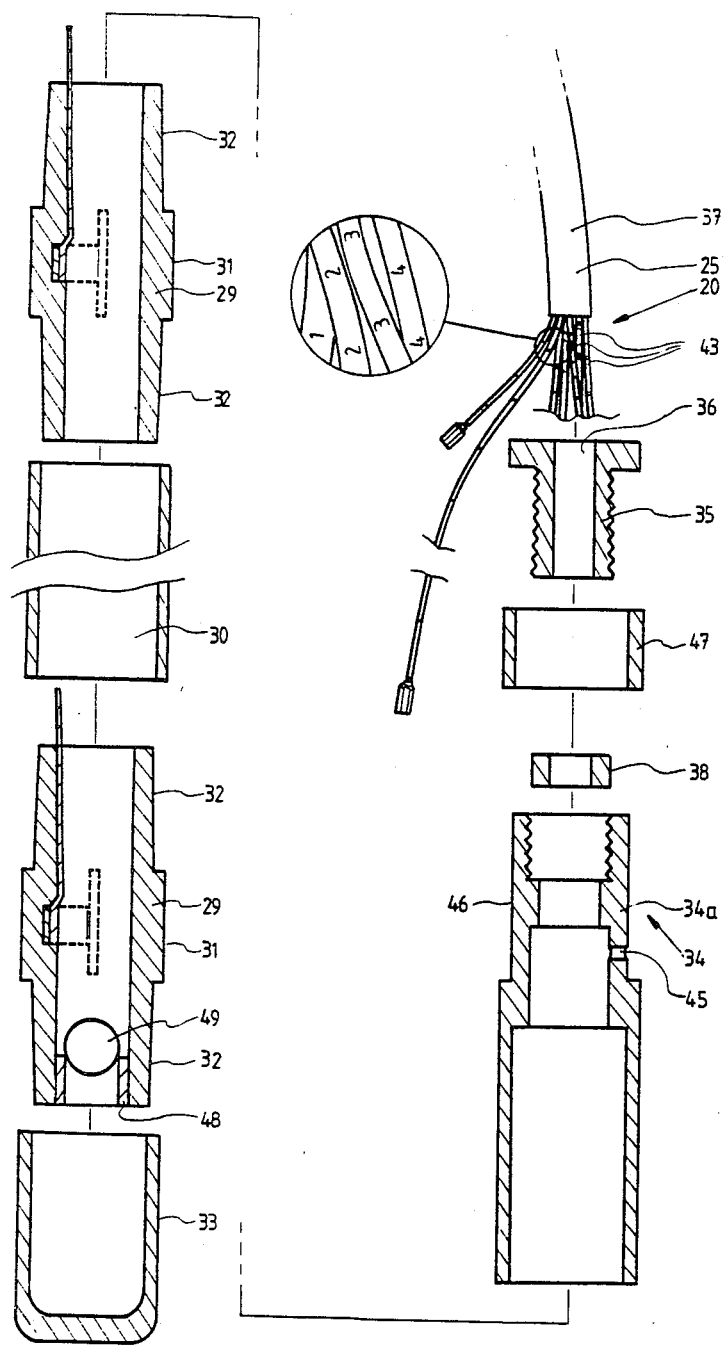
FIG. 2 is an exploded view of the monitoring assembly illustrated in FIG. 1.
Figure 3:
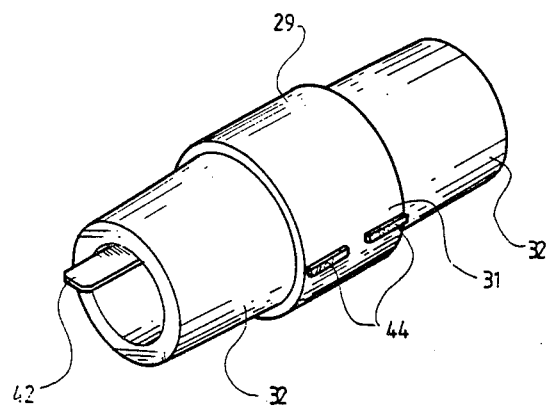
FIGS. 3 and 4 illustrate the sensing component of the monitoring assembly illustrated in FIG. 2.
Figure 4:
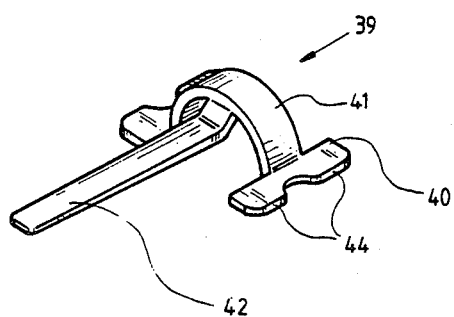

As can be seen in FIGS. 2 to 4 the monitoring assembly 20 is fabricated from a plurality of tubular components which plug into one another to form the elongate body 23. These tubular components include twelve similar sensing sections 29 interconnected by respective spacer sections 30. Each sensing section 29 includes a central hub portion 31 and opposed reduced diameter tapered spigot portions 32 which plug into the spacer sections 30. A bottom cap 33 is provided to close the lower end of the body 23 and the upper end is closed by a gland assembly 34 which fits onto the spigotted upper end 32 of the uppermost sensing section 29. As illustraed the gland assembly 34 includes an internally threaded body portion 34a adapted to receive an externally threaded nut 35 having a bore 36 therethrough which has a diameter substantially equal to the diameter of the cable sheath 37. A rubber washer 38 is adapted to be interposed between the lower end of the nut 35 and the body portion 34a whereby it may clamp sealably about the sheath 37 when the nut 35 is screwed tightly into the body 34a.

Each sensing section 29 supports a stainless steel electrode assembly 39, as illustrated in FIG. 4, which comprises a pair of opposed sensors 40 interconnected by a bridge or arched portion 41 provided with a stepped bayonet connector 42 which is adapted to extend into the bore of the sensing section 29 and outwardly beyond the upper spigot portion 32. This bayonet connector is adapted for connection to a respective numbered lead 43 of the multicore cable 25. The bridge portion 41 is encased within the hub portion 31 and the spaced outermost portions 44 of each sensor 40 protrude beyond the outer surface of the outer hub portion 31 to provide the sensor means 24. The exposed ends of these portions 44 are chamfered to inhibit retention of foreign matter. This arrangement provides four discrete exposed sensing elements which will be effective in operation and which may be located in suitable locating means in injecting moulding apparatus so as to secure the electrode assembly in place during injection moulding operations.

Figure 5:
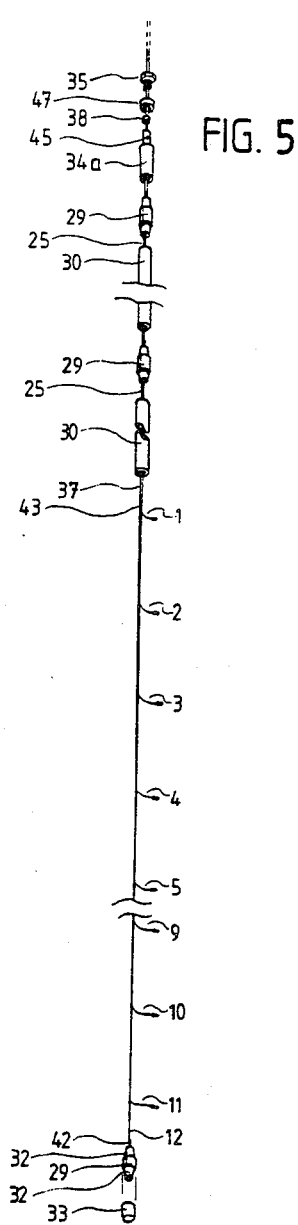
FIG. 5 is a further exploded view illustrating the method of assembling of the monitoring apparatus illustrated in FIG. 2.
Figure 6:
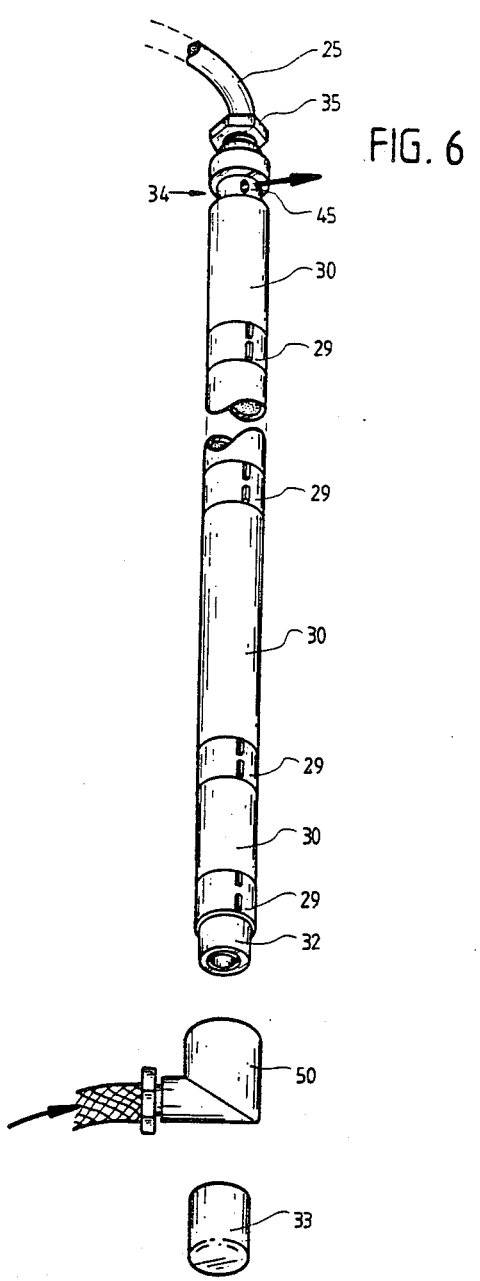
FIG. 6 illustrates a final step in the method of assembling the monitoring apparatus of FIG. 5.

The monitoring assembly 20 is fabricated as shown in FIGS. 5 and 6, by sliding all the body components along the cable 25 and removing the sheath 37 from the end portion of the cable so that the leads 43 are exposed. These are cut to length with the longest lead, No. 12 extending from the gland assembly 34 to the lowermost sensing section 29. These exposed leads 43 are then progressively cutaway to mate with the sensing sections 29 along the body 23.

The longest lead No. 12 is then connected to the bayonet connection 42 of the lower sensing section 30 and the first spacer section 30 is moved downwardly across the exposed leads 43 to engage about the upper spigot end 32. The next sensing section 29 is also moved down across the exposed leads 43 to engage within the upper end of the spacer section 30 and the next longest lead is connected to this sensing section. This operation continues until the shortest lead No. 1 is connected to the uppermost sensing section 29 whereupon the body portion 34a of the gland assembly 34 is engaged about the uppermost sensing section 29. The nut 35 is tightened to clamp the washer 38 about the sheath 37 to ensure a leakproof joint is formed between the sheath and the upper end of the body 23. Preferably the joints between the tubular body components are fixed with a suitable adhesive. The leads are numbered from the top so that a lower portion of the assembly 20 may be cut off without changing the numbering sequence.

It will be seen that body portion 34a is provided with an outlet aperture 45 adjacent the lower end of a reduced diameter stem portion 46. A collar 47, the axial length of which is less than that of the stem portion, may be moved to a covering position about the outlet aperture 45. Furthermore the lowermost sensing section 29 is provided with a lower restricting sleeve 48 above which a heavy ball 49 is retained so as to form a ball valve assembly which will permit liquid to be introduced into the interior of the segmented body 23 and prevent drainage of the liquid therefrom upon removal of the liquid injecting means. Of course other types of valves may be used for this purpose. Thus after the components have been assembled and the gland assembly 34 tightened about the supporting cable 25 the body 23 is supported in an upright attitude and an injector nozzle 50 is engaged about the lower spigotted end 32 of the lowermost sensing section 29 and encapsulating material is injected into the body 23. This material is introduced until it begins to flow through the outlet aperture 45 at the top of the body 23 whereupon the injector nozzle 50 is removed and the end cap 33 is secured to the lower spigot portion 32. The collar 47 is then lowered to conceal the outlet aperture 45. The encapsulating material is preferably an epoxy grout but it may be a pour-in rubber compound or a fibreglass reinforced plastics material.

Figure 7:
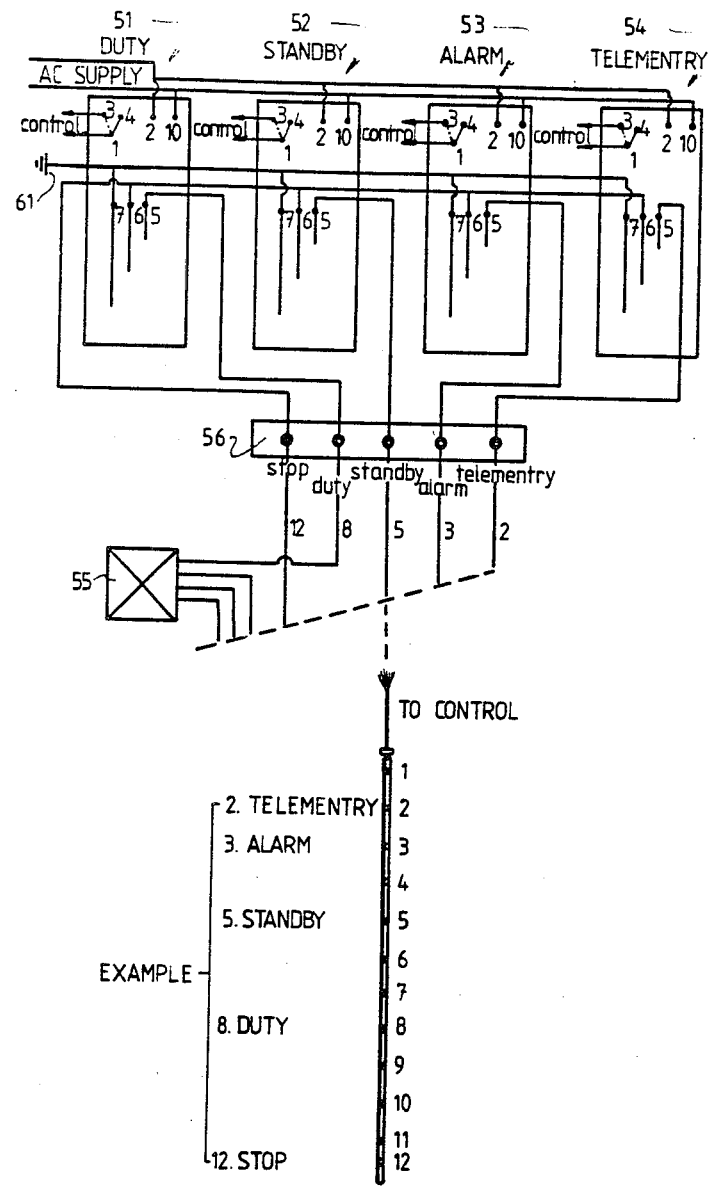
FIG. 7 is a typical circuit diagram illustrating the connection of the monitoring assembly to control means for a pump.

In an installation, as shown in FIG. 7, selected sensors such as numbers 12, 8, 5, 3 and 2 are utilized as active sensors and are connected to respective relays shown at 51, 52, 53 and 54 which control the pump assembly 22 as well as alarm and telemetry signalling means if required. The sensors 12 and 18 monitor the stop and start levels for the pump assembly 22 whereas the sensor 5 provides a standby control in case the pump assembly 22 does not start when the liquid level in the pit reaches sensor 8. Preferably the lowermost sensor No. 12 is used as the pump stop sensor so that the monitoring assembly will substantially clear the lower liquid level and the common connection 61 to the solenoids is formed as an earth connection by the pump or its supporting frame. Thus the common connection and stop sensor are widely spaced and their operation would not be adversely effected by fat build up on the monitoring assembly 20.

It will be seen that the monitoring assembly 20 provides many spare sensors which may be utilized for any desired purpose simply by connecting the appropriate numbered lead to the desired control apparatus. Alternatively selected sensors such as sensors 7 and 9 can be connected, via leads numbered 7 and 9 to switching means 55 which may be a multi position rotary switch together with the duty sensor 8 so that the level at which the pump is actuated to commence pumping operations may be varied between levels 7, 8 and 9 by selecting the appropriate mode for the switching means 55. If desired the latter may be operated automatically to switch cyclically between selected levels to reduce fat build up at any one particular level. Furthermore in lieu of the switch assembly 55 the designated leads 43 from the cable 25 may be simply unplugged from the solenoid connector 56 and replaced with the appropriate cable from a further sensor 24. If fine height adjustment of monitoring levels is required, the monitoring assembly 20 may be raised or lowered or a pair of such assemblies 20 may be utilized and arranged with their sensors at different levels. The level of the assembly 20 may be varied without descending into the pit 21.

The smooth substantially continuous outer surface of the supporting body 23 will inhibit build up of foreign matter such as fat, so that maintenance intervals may be extended. For cleaning purposes however, the assembly 20 can be easily raised to the surface and hosed. Alternatively the pit 21 may be provided with a flexible annular scraper 60 or the like fixed to the wall of the pit and through which or across which the assembly 20 may be drawn to scrape clean the projecting sensor portions 44. If desired the monitoring assembly 20 may taper from top to bottom to further assist in non-retention of foreign matter on its outer surface.

The monitoring assembly 20 may be used in lieu of conventional probes in existing installations and connected directly to the existing control relays. For this purpose the appropriate coded leads are connected to the relays to achieve triggering at the selected levels. Furthermore several of the sensors may be selectively connected through a multi-position rotary switch or switches or the like to a single terminal to enable above ground selection of one of a group of sensors. For example the three lowermost electrodes may be selectively connected via the switch to the terminal for the pump stop control. This would enable the lower level of the liquid to be varied simply by changing the switch mode. This would have the advantage that this level could be increased or decreased to suit the prevailing conditions. Alternatively in installations in which fat build up is a problem, the pump start and/or stop switching levels could be varied from time to time so as to minimise the total fat build-up or the build-up at any one level.

It will be of course be realised that the above has been given only by way of illustrative example of the present invention and that all modifications and variations to the illustrated embodiments as would be apparent to persons skilled in the art are deemed to fall within the broad scope and ambit of this invention as is defined in the appended claims.

The claims defining the invention are as follows:
1. A liquid level monitoring assembly, comprising:
an elongate body formed of an electrically insulating material, said elongate body having an interior and a wall;

a plurality of sensor assemblies supported by said elongate body, said sensor assemblies being spaced along said elongate body at respective sensing stations, each said sensor assembly being a single electrical termination and having a first portion extending axially along said interior of said elongate body and a second portion extending radially outwardly from said first portion, said second portion having at least one part extending through said wall of said elongate body to provide at least one exposed portion which is exposed to liquid outside said elongate body, said exposed portion being exposed around a minor portion of the transverse perimeter of said elongate body at its respective sensing station and along said body for a minor proportion of the spacing between respective said sensor assemblies; and a plurality of electrical leads associated with said sensor assemblies and extending from said body for electrically signalling said sensor assemblies for detecting various liquid levels.

2. A liquid level monitoring assembly according to claim 1, wherein said sensor assemblies are regularly spaced along said elongate body.

3. A liquid level monitoring assembly according to claim 2, wherein each said sensor assembly is of elongate form and extends with its longitudinal sides substantially parallel to the longitudinal axis of said elongate body.

4. A liquid level monitoring assembly according to claim 3, wherein each said sensor assembly includes a pair of electrodes exposed at respective opposite sides of said elongate body and a conductive bridge portion interconnecting said pair of electrodes.

5. A liquid level monitoring assembly according to claim 4, wherein each said electrode extends outwardly beyond said elongate body.

6. A liquid level monitoring assembly according to claim 3, wherein said plurality of electrical leads are constituted by a multicore cable in which each core is visibly identified and connects to a respective said sensor assembly.

7. A liquid level monitoring assembly according to claim 6, wherein each said core is numerically identified and wherein the lowest numbered core is connected to the sensor assembly nearest an end of said elongate body and each subsequent adjacent sensor is connected to the next lowest numbered core.

8. A liquid level monitoring assembly according to claim 7, wherein said multicore cable extends from one end of said elongate body and is provided with a leak-proof sheath which engages sealably with said one end.

9. A liquid level monitoring assembly according to claim 5, wherein said elongate body comprises an outer body part formed of interconnected tubular sections including sensor sections and spacer sections and each said sensor section supports a respective sensor assembly.

10. A liquid level monitoring assembly according to claim 9, wherein said tubular sensor sections include a side wall through which said electrodes extend and a sensor connector inwardly of said wall on said bridge portion.

11. A liquid level monitoring assembly according to claim 10, wherein said elongate body comprises an outer tubular body part which supports said sensor assemblies and contains said cores and an inner body part formed of an encapsulating material introduced into said outer body part after the respective connections between said cores and said sensor connectors have been formed.

12. A liquid level monitoring assembly according to claim 11, wherein said one end is provided with an outlet and the other end is provided with an inlet through which said encapsulating material may be introduced into said outer tubular body part.

13. A liquid level monitoring assembly according to claim 12, wherein said body part is provided with a seal assembly which engages sealably about said multicore cable.

14. A liquid level monitoring assembly for an appliance controller, said monitoring assembly comprising:
an elongate body formed of insulating material, said elongate body having an interior and a wall;
a plurality of sensor assemblies supported by said elongate body, said sensor assemblies being disposed at respective sensing stations spaced regularly along said elongate body for monitoring liquid levels in a reservoir, each said sensor assembly being a single electrical termination and being insulated from one another by said body, each said sensor assembly having a first portion extending axially along said interior of said elongate body and a second portion extending radially outwardly from said first portion, said second portion having at least one part extending through said wall of said elongate body to provide at least one exposed portion which is exposed to liquid outside said elongate body, said exposed portion being exposed partway around said body;
a plurality of electrical leads connected to respective sensor assemblies extending from said body whereby each said sensor assembly may be identified and connected to said controller;
said sensor assemblies including active sensor assemblies which may be concurrently connected to said appliance for actuating said controller at selected liquid levels and further selectively identifiable non-active sensor assemblies which remain available for actuating said controller at alternate liquid levels.

15. A liquid monitoring assembly for an appliance controller, said monitoring assembly comprising:
an elongate body formed of insulating material, said elongate body having an interior and a wall;
a plurality of sensor assemblies supported by said elongate body, said sensor assemblies being disposed at respective sensing stations spaced regularly along said elongate body for monitoring liquid levels in a reservoir, each said sensor assembly being a single electrical termination and being insulated from one another by said body, each said sensor assembly having a first portion extending axially along said interior of said elongate body and a second portion extending radially outwardly from said first portion, said second portion having at least one part extending through said wall of said elongate body to provide at least one exposed portion which is exposed to liquid outside said elongate body, said exposed portion being exposed partway around said body at the respective sensor assembly whereby liquid levels may be monitored by measuring conductivity between a lower electrical termination remote from said monitoring assembly and said sensor assemblies with variations in liquid levels;

a plurality of electrical leads extending from said body whereby each said sensor assembly may be identified and connected to said connector;

said sensor assemblies including active sensor assemblies which may be concurrently connected to said appliance for actuating said controller at selected liquid levels and further selectively identifiable non-active sensor assemblies which remain available for actuating said controller at alternate liquid levels.

16. A method of controlling a pumping apparatus in a reservoir, wherein the liquid level therein is monitored by a liquid level monitoring assembly including an elongate body formed of insulating material, said elongate body having an interior and a wall, said elongate body supporting a plurality of sensor assemblies disposed at selective sensing stations spaced regularly along said elongate body for monitoring liquid levels in said reservoir, each said sensor assembly being a single electrical termination and being insulated from one another by said body, each said sensor assembly having a first portion extending axially along said interior of said elongate body and a second portion extending radially outwardly from said first portion, said second portion having at least one part extending through said wall of said elongate body to provide at least one exposed portion which is exposed to liquid outside said elongate body, said exposed portion being exposed partway around said body at the respective sensor assembly whereby liquid levels may be monitored by measuring conductivity between a lower electrical termination remote from said monitoring assembly and said sensor assembly with variations in liquid levels, a plurality of electrical leads extending from said body whereby each said sensor assembly may be identified and connected to said controller, said sensor assemblies including active sensor assemblies which may be concurrently connected to said appliance for actuating said controller at selected liquid levels and further selectively identifiable non-active sensor assemblies which remain available for actuating said controller at alternate liquid levels, and wherein said appliance controller is for controlling said pumping apparatus, said method comprising:

connecting selected active sensor assemblies through said leads to said controller to monitor upper and lower liquid levels at which said controller starts and stops said pumping apparatus; and periodically interchanging the connection of said controller to said active sensor assemblies with previously non-active sensor assemblies whereby the switching liquid levels are varied.

17. A method of assembling a liquid level monitoring assembly including an elongate body having an outer tubular body part formed of an electrically insulating material, said elongate body having an interior and a wall, said elongate body supporting a plurality of sensor assemblies spaced along said elongate body at respective sensing stations, each said sensor assembly being a single electrical termination and having a first portion extending axially along said interior of said elongate body and a second portion extending radially outwardly from said first portion, said second portion having at least one part extending through said wall of said elongate body to provide at least one exposed portion which is exposed to liquid outside said elongate body, said exposed portion being exposed around a minor portion of the transverse perimeter of said elongate body at its respective sensing stations and along said body for a minor proportion of the spacing between respective said sensor assemblies, and a multicore cable including a plurality of electrical leads associated with said sensor assemblies and extending from said body for electrically signalling said sensor assemblies for detecting various liquid levels, said method comprising:

removing the sheet from one end of said multicore cable to expose the cords for a length substantially equal to the length of said elongate body;

cutting the cores so that their respective lengths decrease progressively towards the sheath cable portions;

connecting the cores to their respective sensor assemblies;

arranging said tubular body about said unsheathed cores; and introducing an encapsulating material into said body through an inlet so as to encapsulate said cores and their connections to said sensor assemblies.

* * * * *